Patented May 6, 1941

2,241,322

UNITED STATES PATENT OFFICE 2,241,322

PROCESS FOR PREPARING POLYAMIDES FROM CYCLIC AMIDES

William E. Hanford, Wilmington, Del., assignor to E. I. du Pont de Nemours & Company, Wilmington, Del., a corporation of Delaware No Drawing. Application February 9, 1939, Serial No. 255,507

10 Claims. (Cl. 260—2)

This invention relates to polymeric materials and more particularly to the preparation of polyamides.

This case is a continuation-in-part of my application Serial Number 232,682 filed September 30, 1938.

This invention has as an object a new method for the manufacture of polyamides. A further object is a new and improved process for the production of fiber-forming polyamides of the kind heretofore obtained by polymerization of amino acids as described in Patent 2,071,253. A still further object is a process for obtaining polyamides of this kind which yields products having good dye affinity and resistance to discoloration or alteration upon heating. Other objects will appear hereinafter.

These objects are accomplished by heating epsilon-caprolactram, or other cyclic amide containing more than 6 annular atoms, under the conditions hereinafter pointed out, with a substantial amount of water.

I have found that cyclic amides of the kind mentioned above, when treated by the process described herein, with amounts of water not less than one-tenth mol per mol of cyclic amide are rapidly converted in high yield to polyamides. In this amount water alone brings about the conversion and it is not necessary that it be used as a promoter for various catalytic bodies, the presence of which is disadvantageous in that they introduce difficultly removable foreign material and produce undesirable dark-colored products. With water in the amount indicated the conversion is markedly more rapid than it is in most instances when catalytic bodies, either with or without a trace of water upon which their efficacy in many instances depends, are used.

In the best method of carrying out my invention the production of the polyamide involves two steps, the first of which consists in heating the lactam and water to a temperature of from 180°–300° C. under superatmospheric pressure (usually from 200 to 280 pounds per square inch) to effect partial polymerization. When most of the monomer has been converted to a low polymer, the water is allowed to distill gradually from the reaction mixture while polymerization continues. The pressure is finally reduced to atmospheric, and the second step comprises completing the polymerization by heating at atmospheric pressure in the range of 180°–300° C. It is sometimes advantageous, though in no wise essential, to carry out the final stage of the reaction under diminished pressure to effect removal of unchanged monomer and more complete removal of water from the polymer.

The reaction may advantageously be carried out in the presence of a small quantity of a viscosity stabilizer, i. e. a compound capable of reacting with an amino group or a carboxyl group or with both to form a stable derivative. This derivative is considered stable in the sense that an amino or carboxyl group which is so blocked is no longer capable of participating in the polymerization reaction. The purposes of such a compound are (1) to limit the length of the polyamide chains, thus providing a polymer of desired physical properties which will not undergo further polymerization or depolymerization with consequent viscosity change on subsequent heat treatment; (2) to stabilize the polymer against discoloration on heating in air; and (3) to impart enhanced dye affinity to the resulting polymer. Compounds suitable for this purpose include such substances as monofunctional acids and amines, polyfunctional acids and amines, and salts of such acids. These stabilizers serve no apparent catalytic purpose in promoting the polymerization reaction when used according to the process of this invention; the reaction takes place rapidly and smoothly when water alone is present. Advantage is derived from the use of such stabilizers, however, in the improved properties of the resulting polymer.

With regard to the production of light-colored polyamides, I have observed that when caprolactam is prepared by rearrangement of cyclohexanone oxime, some of the oxime is invariably present in the crude lactam and the actual amount varies with the conditions of the rearrangement. I have discovered that the cream to brown color of the polyamides obtained from caprolactam converted to polymers in the substantial absence of oxygen is due to the cyclohexanone oxime contained in the lactam, and that for the production of tough white polymers the oxime content of the lactam must be reduced to less than 0.5% and preferably less than 0.1%. Lactam of less than 0.1% impurity dissolves in a small amount of water to a clear solution. On the other hand, lactam containing larger amounts of oxime gives a turbid solution in a small quantity of water.

Special precautions are necessary to remove cyclohexanone oxime from the lactam. Fractional distillation through a long Fenske column packed with glass helices may be employed to accomplish separation of the oxime. It has been found, however, that in some cases this is not entirely satisfactory because of the large foreshot, boiling at practically the same temperature as the pure lactam, which contains sufficient oxime to give a cloudy solution in water. More satisfactory is the practice of washing a solution of the crude lactam in an organic solvent with an aqueous saturated salt solution containing alkali. The alkali dissolves most of the oxime, while the saturated salt solution takes up but little lactam. This procedure reduces the oxime content to such a point that careful fractional distillation through a good column serves efficiently to separate what little oxime remains. Epsilon-caprolactam which has been thus purified can be readily converted to white, tough polymers.

The following examples are further illustrative of the methods used in practicing my invention. Temperatures are expressed in degrees centigrade, and parts are by weight.

Example I

Epsilon-caprolactam and $\frac{1}{10}$ molecular equivalent of water were heated at 250° for 6 hours in a sealed tube with an inert atmosphere. The tube was then opened and heated at 255° under atmospheric pressure to allow the water to distill off and to complete the polymerization. After 2 hours a high degree of polymerization had been attained as evidenced by a melt viscosity of $2030\eta$ at 255°. The reaction was stopped after 2 hours more, and the polymer was obtained as a very hard and tough white solid.

Example II

A metal bomb was charged with 30 parts of epsilon-caprolactam and 19.1 parts of water (4 molecular equivalents) containing 0.063 parts of acetic acid ($\frac{1}{250}$ molecular equivalent) to serve as a stabilizer. The bomb was sealed, provided with an inert atmosphere, and heated at 250° for 1.5 hours. During this period, a little water vapor was bled off to keep the pressure from exceeding 250 pounds per square inch. At the end of this time, the pressure was allowed to fall to atmospheric and the removal of water and completion of the polymerization was effected by heating for 1 hour at 250° under atmospheric pressure. There was obtained a hard, tough polymer intrinsic viscosity of which was 0.70.

Example III

Five parts of the mixture of isomeric lactams obtained by the rearrangement of a mixture of methyl cyclohexanone oximes with sulfuric acid was heated with 1 equivalent of water in a sealed tube and inert atmosphere for 40 hours at 250°. The tube was then opened and heated at 255° for 6 hours while a current of moist nitrogen was passed through the molten polymer; the heating was then continued for 2 hours longer while a current of dry nitrogen was passed through the melt. Polymerization was completed by heating for 2 hours at 255° under 5 mm. pressure. The polymer so obtained was a clear, hard, horny solid with an intrinsic viscosity of 0.88.

Example IV

Two parts of cyclo-octanone isoxime was heated with 1 molecular equivalent of water in a sealed tube and inert atmosphere for three hours at 250°. It was then heated 1 hour under 5 mm. pressure at 255°. There was obtained a white, tough polymer melting at 178°; it had an intrinsic viscosity of 0.84.

Example V

A mixture of 2.5 parts of 3-methyl cyclohexanone isoxime, 7.5 parts of monomeric hexamethylene diammonium adipate, and 0.2 part of water (This, in addition to the water liberated during the polymerization of the hexamethylene diammonium adipate, amounts to 1 molecular equivalent of water based on the isoxime), was heated in a sealed tube and inert atmosphere for 4 hours at 250°. Although the melt had become viscous at this time, heating was continued for an additional 20 hours. The tube was then opened and the mixture heated for 3 hours at 255° while a stream of moist nitrogen was passed through the melt, and then for 1 hour with a current of dry nitrogen passing through the melt. The polymer so obtained was a tough, white solid which softened at 194° and had an intrinsic viscosity of 0.85.

The quantity of water used in carrying out the present process is preferably from one to four molecular equivalents of water and is generally less than ten moles of water per mole of cyclic amide. Greater amounts of water are of no advantage, and since they require greater heat inputs and more voluminous bleed-offs, are uneconomical. When less than one-tenth molecular equivalent of water is used, the time required to obtain high molecular weight polymers becomes so long as to make the process impracticable.

The time of reaction is dependent on both the temperature employed and the amount of water used. However, it is not difficult to achieve a high degree of polymerization in 8 hours by the process of this invention. For example, a high molecular weight polymer can be prepared in 8 hours by heating epsilon-caprolactam with $\frac{1}{10}$ molecular equivalent of water at 250° C. When larger amounts of water are employed this time may be materially shortened, as for instance, in Example II in which 4 mols of water require 2.5 hours at 250° C.

In general I prefer to operate in the range 200°–280° C., inasmuch as too low temperatures require protracted periods of heating, and too high temperatures tend to occasion extensive decomposition and depolymerization. The final stage of the polymerization may be carried out under diminished pressure in order to remove unreacted monomer and to remove the water more completely. The use of diminished pressure is not essential to the process, however, and high molecular weight polymers can be obtained without such treatment.

The process of this invention is, in general, applicable to monomeric cyclic amides containing more than 6 annular atoms, such as cyclohexanone isoxime (epsilon-caprolactam), the methyl cyclohexanone isoximes, cycloheptanone isoxime, cyclo-octanone isoxime, cyclopentadecanone isoxime, cyclohexadecanone isoxime and monomeric cyclic hexamethylene adipamide; it is particularly applicable, however, to epsilon-caprolactam. These isoximes may be obtained by the rearrangement of the corresponding cyclic ketoximes with sulfuric acid. The cyclic amides used are preferably those which are not heavily substituted since certain lactams which bear several substituents on the ring, such as the lactams obtained by rearrangement of menthone oxime, resemble 5- and 6-membered rings in having a marked tendency toward ring closure as opposed to intermolecular reaction once the ring is opened.

Substances which may serve as stabilizers for polymers produced by the process of this invention include monobasic acids, such as acetic, propionic, butyric, and stearic acids; dibasic acids, such as adipic and sebacic acids; ammonia; monoamines, such as methylamine, isobutylamine, amylamine, and stearylamine; diamines, such as hexamethylene diamine and decamethylenediamine; salts of acids, such as sodium acetate and ammonium chloride; amino acid derivatives, such as epsilon-benzoylaminocaproic acid and epsilon-(p-toluenesulfonylamino)-caproic acid; and amino alcohols, such as ethanolamine. The quantity of stabilizer used is dependent on the properties desired in the resulting polymer. In general, the stabilizer is added in the proportion of from $\frac{1}{50}$ to $\frac{1}{250}$ molecular equivalents based on the lactam, if a fiber-forming polymer is desired.

The process of this invention is also applicable to the production of interpolymers, such as interpolymers prepared from lactams and amino acids, hydroxy acids, diamine-dibasic acid, glycol diester, and glycol diacid combinations. That is, it may be used in the production of interpolymers from lactams and other polymer-forming reactants.

If a colored product is desirable, the process of this invention may be carried out in the presence of a pigment. The polymers may also be modified by carrying out the polymerization in the presence of a plasticizer or other modifying agent.

The polymers formed by the process of this invention, which are apparently chemically identical with those obtained from epsilon-aminocaproic acid, are characterized by their high melting points (212°–214° C.) and by the fact that they can be formed into filaments which yield oriented fibers on the application of tensile stress in the solid state, e. g. "cold drawing." They are further characterized by their microcrystalline nature, as evidenced by their sharp melting points and X-ray diffraction patterns. In general, to obtain polymers capable of being formed into oriented fibers, the heating should be prolonged until the polymer has an intrinsic viscosity of about 0.4. Intrinsic viscosity is here used as defined in Patent 2,130,948.

The polyamides obtained by the practice of this invention, in addition to being useful in the manufacture of fibers, are useful in the production of films, coating compositions, and molding compositions.

As many apparently widely different embodiments of this invention may be made without departing from the spirit and scope thereof, it is to be understood that I do not limit myself to the specific embodiments thereof except as defined in the appended claims.

I claim:

1. A process for preparing polyamides which comprises heating a cyclic amide as an initial polyamide-forming reactant under superatmospheric pressure with water in amount of at least 0.1 mol of water per mol of the cyclic amide, and continuing said heating under superatmospheric pressure with retention of said amount of water until the cyclic amide has been converted mostly to polyamide, said cyclic amide containing more than 6 annular atoms in which the nitrogen is amido nitrogen and is an integral part of the ring.

2. The process set forth in claim 1 in which said cyclic amide is heated in a closed system in the presence of from 0.1 to 10 mols of water per mol of lactam.

3. A process for preparing polyamides which comprises heating a cyclic amide as an initial polyamide-forming reactant at 180° to 300° C. under superatmospheric pressure with from 0.1 to 10 mols of water per mol of the cyclic amide and continuing said heating under superatmospheric pressure with retention of said amount of water until the cyclic amide has been converted mostly to polyamide, and then removing water from the reaction and continuing polymerization at said temperature with removal of water until a high molecular weight fiber-forming polyamide is obtained, said cyclic amide containing more than 6 annular atoms, in which the nitrogen is amido nitrogen and is an integral part of the ring.

4. The process set forth in claim 1 in which said cyclic amide is epsilon-caprolactam.

5. The process set forth in claim 1 in which the water is present in amount of from 1 to 4 mols of water per mol of the cyclic amide.

6. The process set forth in claim 1 in which said amide is epsilon-caprolactam and in which the water is present in amount of from 1 to 4 mols of water per mol of the cyclic amide.

7. The process set forth in claim 3 in which said cyclic amide is epsilon-caprolactam.

8. The process set forth in claim 3 in which the water is present in amount of from 1 to 4 mols of water per mol of the cyclic amide.

9. The process set forth in claim 3 in which said amide is epsilon-caprolactam and in which the water is present in amount of from 1 to 4 mols of water per mol of the cyclic amide.

10. A process for obtaining light colored polyamides from epsilon-caprolactam containing cyclohexanone oxime which comprises the step of reducing the oxime content to less than 0.5% and heating the purified lactam under superatmospheric pressure with water in amount of at least 0.1 mol of water per mol of the lactam and continuing said heating under superatmospheric pressure with retention of said amount of water until a polymeric product is obtained.

WILLIAM E. HANFORD.